F. DAVIS.
Door-Bolt.

No. 202,158. Patented April 9, 1878.

Attest:

Inventor:
Frank Davis
by W. H. Babcock
Attorney.

UNITED STATES PATENT OFFICE.

FRANK DAVIS, OF NORTH ADAMS, MASSACHUSETTS.

IMPROVEMENT IN DOOR-BOLTS.

Specification forming part of Letters Patent No. 202,158, dated April 9, 1878; application filed January 29, 1878.

*To all whom it may concern:*

Be it known that I, FRANK DAVIS, of North Adams, in the county of Berkshire and State of Massachusetts, have invented certain new and useful Improvements in Door-Bolts; and I do hereby declare that the following is a full, clear, and exact description of my invention, which will enable others skilled in the art to which it appertains to make and use the same, reference being had to the accompanying drawings, and to letters of reference marked thereon, which form a part of this specification.

This invention is an improvement on Letters Patent No. 190,561, granted to the undersigned May 8, 1877.

The nature of said invention consists, chiefly, in combining a cylindrical outer casing with an inner casing, constructed and recessed as hereinafter described, said casings combining to inclose the operating mechanism, and to form a fulcrum and guide therefor; and in combining, with said casings, a bolt, pitman, and hub, so constructed and arranged as to operate in the same without pivot-pins or any additional devices all as hereinafter more fully described and claimed.

Figure 1:
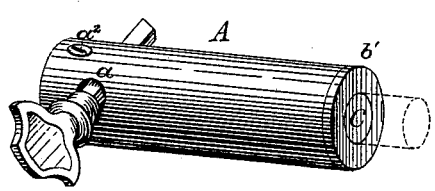
Figure 2:
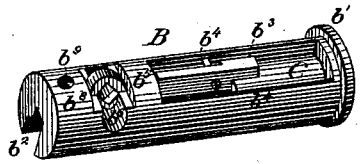
Figure 3:
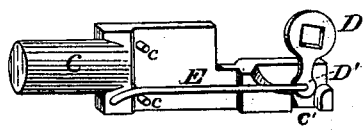
Figure 4:
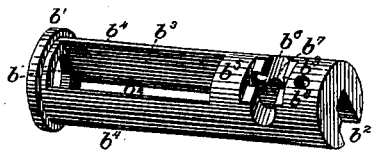
Figure 5:
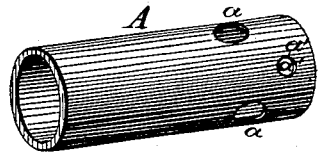

In the accompanying drawings, Figure 1 represents the device as a whole in perspective. Fig. 2 represents a perspective view of the inner casing and contents. Fig. 3 is a detail view of the bolt and its attachments. Fig. 4 is a detail view of the inner casing. Fig. 5 is a detail view of the outer casing.

A designates a cylindrical metallic outer casing or sleeve, which is provided with opposite openings $a$ $a$ near its rear end, and with a hole, $a^1$, for attachment by means of screw $a^2$ to inner casing B.

It is obvious that any known equivalent fastening may be substituted for said screw. Said casing A is preferably a mere shell of steel, but both the material and thickness can be considerably varied without departing from my invention.

Inner casing B is of brass, cast-iron, or other cheap metal, and has such diameter as allows it to pass readily into said outer casing or sleeve, and to be conveniently withdrawn therefrom. It is provided at the front end with a disk, which has a central opening, $b$, for the passage of the bolt, and an annular flange, $b^1$, which prevents it from being forced back too far within said exterior casing. The bottom of said inner casing B has a broad longitudinal slot, $b^2$, extending from end to end, and communicating with a similar longitudinal slot, $b^3$, in the top of said casing B, which extends about two-thirds of the length of said casing, beginning just behind said front disk. The interior of the forward part of said inner casing is thus entirely removed, leaving vertical walls $b^4$ $b^4$ on each side of the space thus produced. This space is separated by a transverse partition, $b^5$, from a transverse groove, $b^6$, in the bottom of which is a longitudinal slot, $b^7$. A transverse partition, $b^8$, at the rear of said groove and slot, forms part of the rear end of casing B, and has in its top screw-threaded hole or socket $b^9$, for the reception of fastening-screw $a^2$.

C designates the door-bolt, having guide-pins $c$ on its side, and near its rear end a recess, $c'$, in which works the lower end of crank-arm D', formed in one piece with flat hub D. Said lower end of crank-arm D' is connected by pitman E to the front part of said bolt. Said hub D, when in position for use, extends up through said slot $b^7$, so that its square or similarly-shaped central hole is in a line with transverse groove $b^6$ of inner casing B, and opposite holes $a$ $a$ of outer casing A. The prismatic shank of the key is passed through said holes and groove, and operated as usual to shoot or draw the bolt.

I do not confine myself to the exact details of construction shown, as these may be somewhat modified in various ways without departing from the spirit of my invention.

The working parts of my mechanism are more firmly secured and more perfectly protected than in my former patent, as hereinbefore recited. I also deem the shape of my new hub and crank preferable for practical working.

Having thus described my invention, what I claim as new, and desire to protect by Letters Patent, is—

1. The combination, with a door-bolt and operating mechanism, of a cylindrical exterior casing and a recessed inner casing, said casings combining to inclose the operating mechanism, and to form a fulcrum and guide therefor, substantially as set forth.

2. The combination of casing A, having opposite holes $a$ $a$, with inner casing B, having transverse groove $b^6$ and slot $b^7$, flat hub D, having crank-arm D′, and the bolt and pitman, substantially as set forth.

3. The combination of cylindrical outer casing A with inner casing B, having annular front flange $b^1$, side walls $b^4$ $b^4$, transverse partitions $b^5$ and $b^8$, transverse groove $b^6$, and slot $b^7$, said casings being securely fastened together and adapted to receive the bolt and working mechanism, substantially as set forth.

In testimony that I claim the foregoing as my own I affix my signature in presence of two witnesses.

FRANK DAVIS.

Witnesses:
   GEORGE TERRY,
   ROGER M. SHERMAN.